(12) United States Patent
Pebley et al.

(10) Patent No.: US 9,975,569 B2
(45) Date of Patent: May 22, 2018

(54) SYSTEM AND METHOD FOR CONTROLLING ELECTRIC POWER STEERING ASSIST

(75) Inventors: Kirk Pebley, Novi, MI (US); Sangeetha Sangameswaran, Canton, MI (US); William James Bouse, Ann Arbor, MI (US); John Michael Jakupco, New Boston, MI (US); Kevin Roy Harpenau, Peachtree City, GA (US)

(73) Assignee: Ford Global Technologies, LLC, Dearborn, MI (US)

(*) Notice: Subject to any disclaimer, the term of this patent is extended or adjusted under 35 U.S.C. 154(b) by 629 days.

(21) Appl. No.: 13/165,826

(22) Filed: Jun. 22, 2011

(65) Prior Publication Data

US 2012/0330508 A1 Dec. 27, 2012

(51) Int. Cl.
  B62D 5/04 (2006.01)
(52) U.S. Cl.
  CPC ......... B62D 5/046 (2013.01); B62D 5/0481 (2013.01)
(58) Field of Classification Search
  CPC .................. B62D 5/046; B62D 5/0481
  USPC ........... 701/36, 41, 99, 123; 477/2; 903/902; 180/65.1, 443; 123/179.3
  See application file for complete search history.

(56) References Cited

U.S. PATENT DOCUMENTS

| | | | | |
|---|---|---|---|---|
| 5,078,225 A | * | 1/1992 | Ohmura et al. | 180/446 |
| 5,694,902 A | * | 12/1997 | Miwa et al. | 123/493 |
| 5,934,396 A | * | 8/1999 | Kurita | 180/65.25 |
| 5,992,558 A | * | 11/1999 | Noro et al. | 180/446 |
| 6,032,091 A | * | 2/2000 | Noro et al. | 701/42 |
| 6,148,949 A | * | 11/2000 | Kobayashi et al. | 180/446 |
| 6,223,852 B1 | * | 5/2001 | Mukai et al. | 180/446 |
| 6,326,753 B1 | * | 12/2001 | Someya et al. | 318/471 |
| 6,390,229 B1 | * | 5/2002 | Kaji | 180/443 |
| 6,427,105 B1 | * | 7/2002 | Matsushita | 701/41 |
| 6,598,698 B2 | * | 7/2003 | Murata et al. | 180/443 |
| 6,647,330 B1 | * | 11/2003 | Gluch | 701/41 |
| 6,675,758 B2 | * | 1/2004 | Nagata et al. | 123/192.1 |
| 7,496,435 B2 | * | 2/2009 | Iwatsuki et al. | 701/22 |
| 7,610,133 B2 | * | 10/2009 | Nagase et al. | 701/41 |
| 7,792,619 B2 | * | 9/2010 | Uryu | 701/41 |
| 2004/0064228 A1 | * | 4/2004 | Yamamoto et al. | 701/41 |
| 2005/0038585 A1 | * | 2/2005 | Asaumi et al. | 701/43 |
| 2005/0205344 A1 | * | 9/2005 | Uryu | 180/446 |
| 2006/0150937 A1 | * | 7/2006 | Lupo et al. | 123/179.4 |
| 2007/0157910 A1 | * | 7/2007 | Obayashi et al. | 123/559.1 |
| 2007/0199533 A1 | * | 8/2007 | Takahashi | 123/179.4 |
| 2007/0247766 A1 | * | 10/2007 | Zeniya et al. | 361/25 |
| 2008/0035411 A1 | * | 2/2008 | Yamashita et al. | 180/443 |

(Continued)

FOREIGN PATENT DOCUMENTS

WO 2007134888 A1 11/2007

*Primary Examiner* — Courtney D Heinle
(74) *Attorney, Agent, or Firm* — David B. Kelley; Brooks Kushman P.C.

(57) ABSTRACT

An automotive vehicle may include an engine, an electric power steering system and at least one controller. The at least one controller may, during an auto stop event of the engine, reduce at a first rate an available electric power steering system current to a non-zero threshold value before fuel to the engine is shut off and reduce at a second rate different than the first rate the available electric power steering system current from the non-zero threshold value to 0 after fuel to the engine is shut off.

18 Claims, 3 Drawing Sheets

(56) References Cited

U.S. PATENT DOCUMENTS

| | | | |
|---|---|---|---|
| 2008/0047776 A1* | 2/2008 | Kobayashi et al. | 180/446 |
| 2009/0227417 A1* | 9/2009 | Imamura et al. | 477/5 |
| 2009/0292420 A1* | 11/2009 | Choi | 701/41 |
| 2009/0292454 A1* | 11/2009 | Nakai | 701/113 |
| 2010/0082220 A1* | 4/2010 | Whitney et al. | 701/102 |
| 2010/0174460 A1* | 7/2010 | Gibson et al. | 701/54 |
| 2010/0244459 A1* | 9/2010 | Gibson et al. | 290/38 R |
| 2010/0286868 A1* | 11/2010 | Ehara et al. | 701/41 |
| 2011/0000736 A1* | 1/2011 | Oya | 180/443 |
| 2011/0004396 A1* | 1/2011 | Yamaguchi | 701/113 |
| 2011/0035107 A1* | 2/2011 | Izutani et al. | 701/41 |
| 2011/0120406 A1* | 5/2011 | Laubender | 123/185.1 |
| 2011/0147211 A1* | 6/2011 | Inagaki | 204/406 |
| 2011/0160965 A1* | 6/2011 | Oh | 701/42 |
| 2011/0231064 A1* | 9/2011 | Abe et al. | 701/41 |
| 2011/0257843 A1* | 10/2011 | Nishimura et al. | 701/41 |
| 2011/0277728 A1* | 11/2011 | Schoenek et al. | 123/320 |
| 2012/0101683 A1* | 4/2012 | Nishimura | 701/41 |
| 2012/0239271 A1* | 9/2012 | Tajima et al. | 701/102 |
| 2012/0316749 A1* | 12/2012 | Ubukata et al. | 701/102 |
| 2012/0317967 A1* | 12/2012 | Donohue | 60/423 |
| 2013/0006499 A1* | 1/2013 | Date et al. | 701/104 |

\* cited by examiner

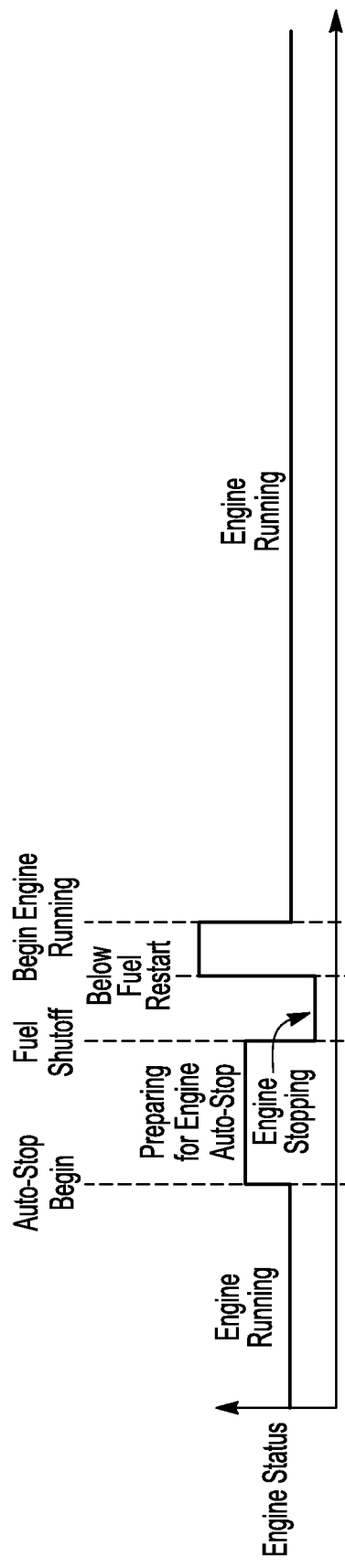
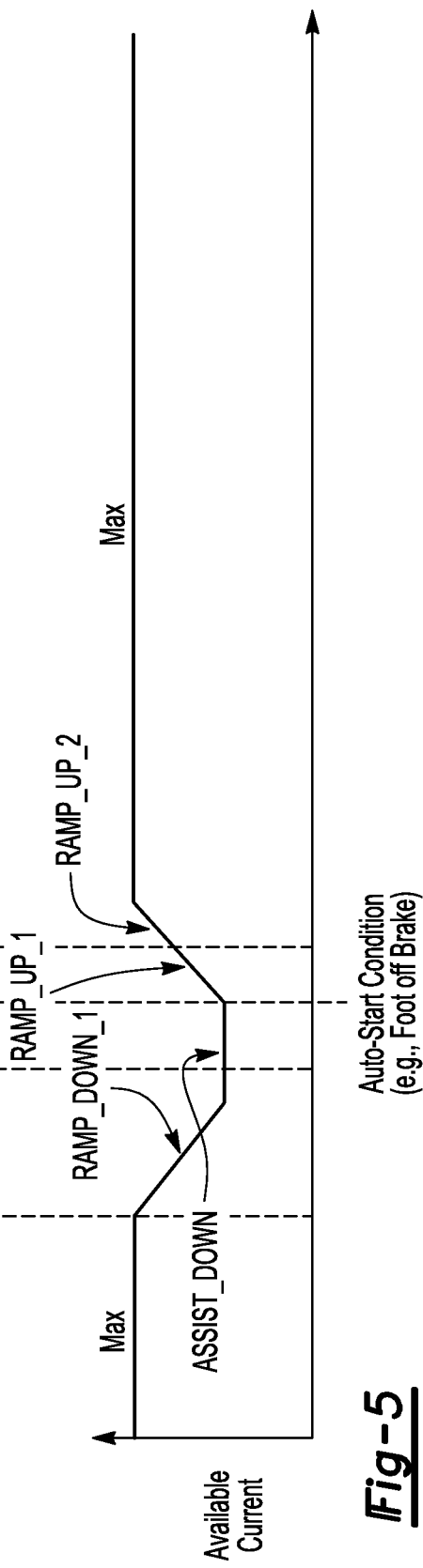
Fig-4
Fig-5

SYSTEM AND METHOD FOR CONTROLLING ELECTRIC POWER STEERING ASSIST

TECHNICAL FIELD

This disclosure relates to strategies for controlling electric power steering assist during engine auto stops and engine auto starts.

BACKGROUND

A micro hybrid vehicle may stop its internal combustion engine after coming to a stop. Such a vehicle may also restart its engine before accelerating from the stop. These engine auto stops and auto starts may improve fuel economy by reducing engine idle time (and thus fuel consumption) for a given drive cycle.

SUMMARY

An automotive vehicle may include an engine, an electric power steering system, and at least one controller. The at least one controller, during an auto stop event of the engine, may reduce an available electric power steering system current before fuel to the engine is shut off.

The available electric power steering system current may be reduced to a non-zero threshold value.

The at least one controller may further reduce the available electric power steering system current from the non-zero threshold value to 0 after fuel to the engine is shut off.

The rate at which the available electric power steering system current is reduced before fuel to the engine is shut off may be different than a rate at which the available electric power steering system current is reduced after fuel to the engine is shut off.

The vehicle may further include a starter. The at least one controller may further, during the auto stop event of the engine, increase from 0 the available electric power steering system current after the starter is disengaged from cranking the engine.

The available electric power steering system current may be increased to a non-zero threshold value before the engine is running at or above target idle speed.

The at least one controller may further increase the available electric power steering system current from the non-zero threshold value to a maximum value after the engine is running at or above target idle speed.

A rate at which the available electric power steering system current is increased from 0 to the non-zero threshold value may be different than a rate at which the available electric power steering system current is increased from the non-zero threshold value to the maximum value.

The at least one controller may further, during the auto stop event, detect an auto start condition and in response, increase the available electric power steering system current.

A rate at which the available electric power steering system current is increased before the engine is running at or above target idle speed may be different than a rate at which the available electric power steering system current is increased after the engine is running at or above target idle speed.

An automotive vehicle may include an engine, an electric power steering system, and at least one controller. The at least one controller may, during an auto stop event of the engine, reduce at a first rate an available electric power steering system current to a non-zero threshold value before fuel to the engine is shut off and reduce at a second rate different than the first rate the available electric power steering system current from the non-zero threshold value to 0 after fuel to the engine is shut off.

A method for controlling an automotive electric power steering system may include detecting an auto stop event for an engine and in response to detecting the auto stop event for the engine, reducing an available electric power steering system current before fuel to the engine is shut off.

The available electric power steering system current may be reduced to a non-zero threshold value.

The method may further include reducing the available electric power steering system current from the non-zero threshold value to 0 after fuel to the engine is shut off.

A rate at which the available electric power steering system current is reduced before fuel to the engine is shut off may be different than a rate at which the available electric power steering system current is reduced after fuel to the engine is shut off.

The method may further include increasing from 0 the available electric power steering system current, during the auto stop event of the engine, after a starter is disengaged from cranking the engine.

The available electric power steering system current may be increased to a non-zero threshold value before the engine is running at or above target idle speed.

The available electric power steering system current may be increased from the non-zero threshold value to a maximum value after the engine is running at or above target idle speed.

The rate at which the available electric power steering system current is increased from 0 to the non-zero threshold value may be different than a rate at which the available electric power steering system current is increased from the non-zero threshold value to the maximum value.

The method may further include, during the auto stop event, detecting an auto start condition and in response, increasing the available electric power steering system current.

BRIEF DESCRIPTION OF THE DRAWINGS

FIG. 4 is a plot illustrating engine status during a partial auto stop event.

FIG. 5 is a plot illustrating available electric power steering assist current during the partial auto stop event of FIG. 4.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
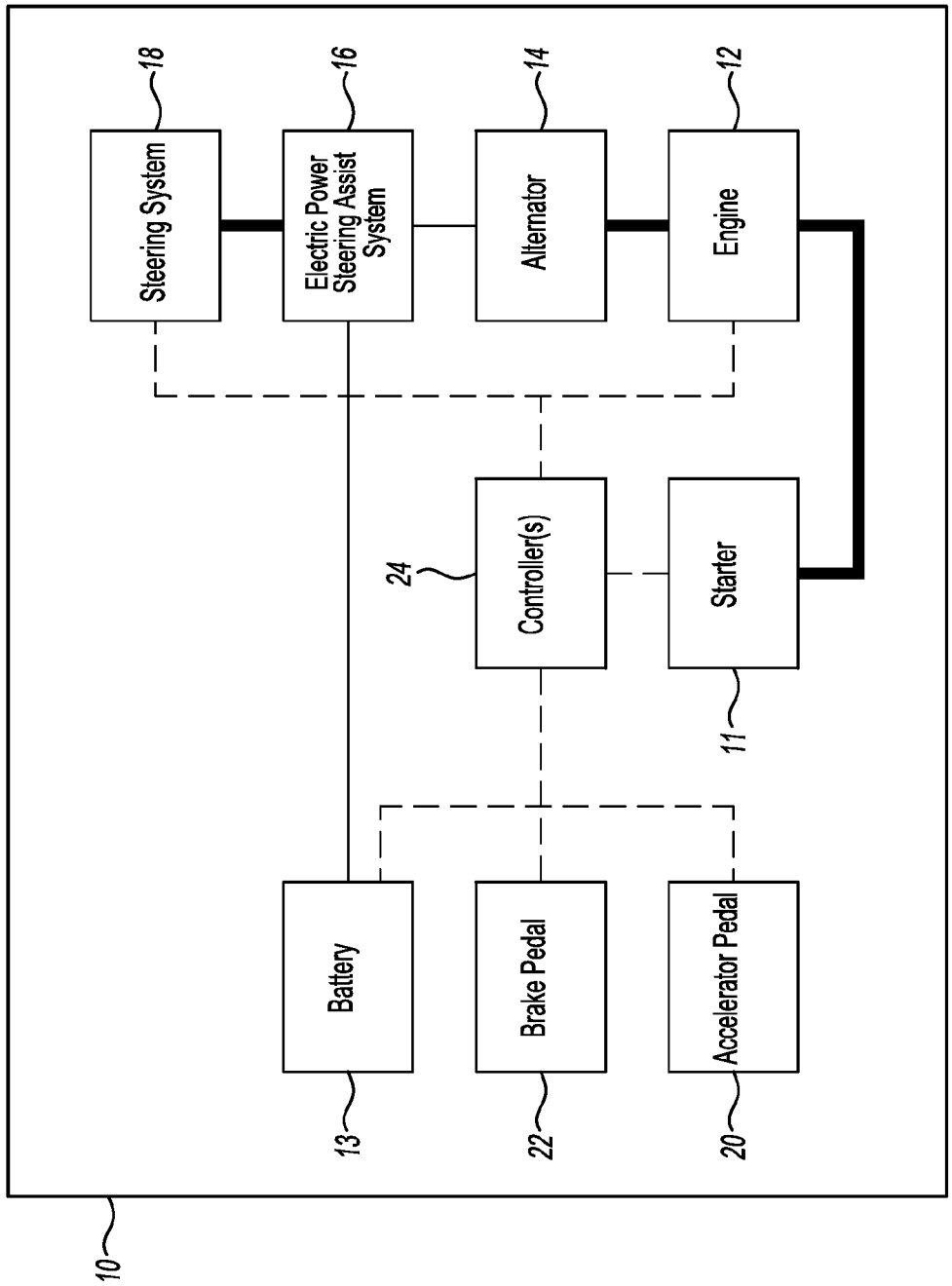
FIG. 1 is a block diagram of a micro hybrid vehicle.

Referring to FIG. 1, a micro hybrid vehicle 10 may include a starter 11, an engine 12, a battery 13, an alternator 14, an electric power steering assist system 16, and a steering system 18 (e.g., steering wheel, etc.) The vehicle 10 may also include an accelerator pedal system 20, a brake pedal system 22, and one or more controllers 24. The starter 11, engine 12, battery 13, steering system 18, and pedal systems 20, 22 are in communication with/under the control of the controllers 24 (as indicated by dashed line). The starter 11 is arranged to mechanically crank the engine 12 (as indicated by heavy line). The engine 12 is arranged to mechanically drive the alternator 14 (as indicated by heavy line) such that the alternator 14 generates electric current. The alternator 14 is electrically connected with the electric power steering assist system 16 (as indicated by light line), which is configured to reduce steering efforts associated with the steering system 18. As such, the electric power steering assist system 16 may consume current generated by the alternator 14. The battery 13 is also electrically connected with the electric power steering assist system 16 (as indicated by light line). Hence, the battery 13 may provide electric current for consumption by the electric power steering assist system 16 when, for example, the engine 12 is off.

The controllers 24 may initiate an auto stop or an auto start of the engine 12. As the driver engages the brake pedal 22 and the vehicle 10 comes to a stop, for example, the controllers 24 may issue a command to begin the process to stop the engine 12, thus preventing the engine 12 from powering the electric power steering system 16 via the alternator 14. As the driver disengages the brake pedal 22 (and/or engages the accelerator pedal 20) after an engine stop, the controllers 24 may issue a command to begin the process to start the engine 12, thus enabling the engine 12 to power the electric power steering assist system 16 via the alternator 14.

Sudden changes in steering efforts during engine auto stop events may cause driver dissatisfaction. Hence, the battery 13 may provide electric power for consumption by the electric power steering assist system 16 as mentioned above. The load generated by the electric power steering assist system 16, however, may exceed the capabilities of the battery 13 if the battery 13 is used to power the electric power steering assist system 16 for the entire duration of the engine auto stop event.

Figures 2, 3:
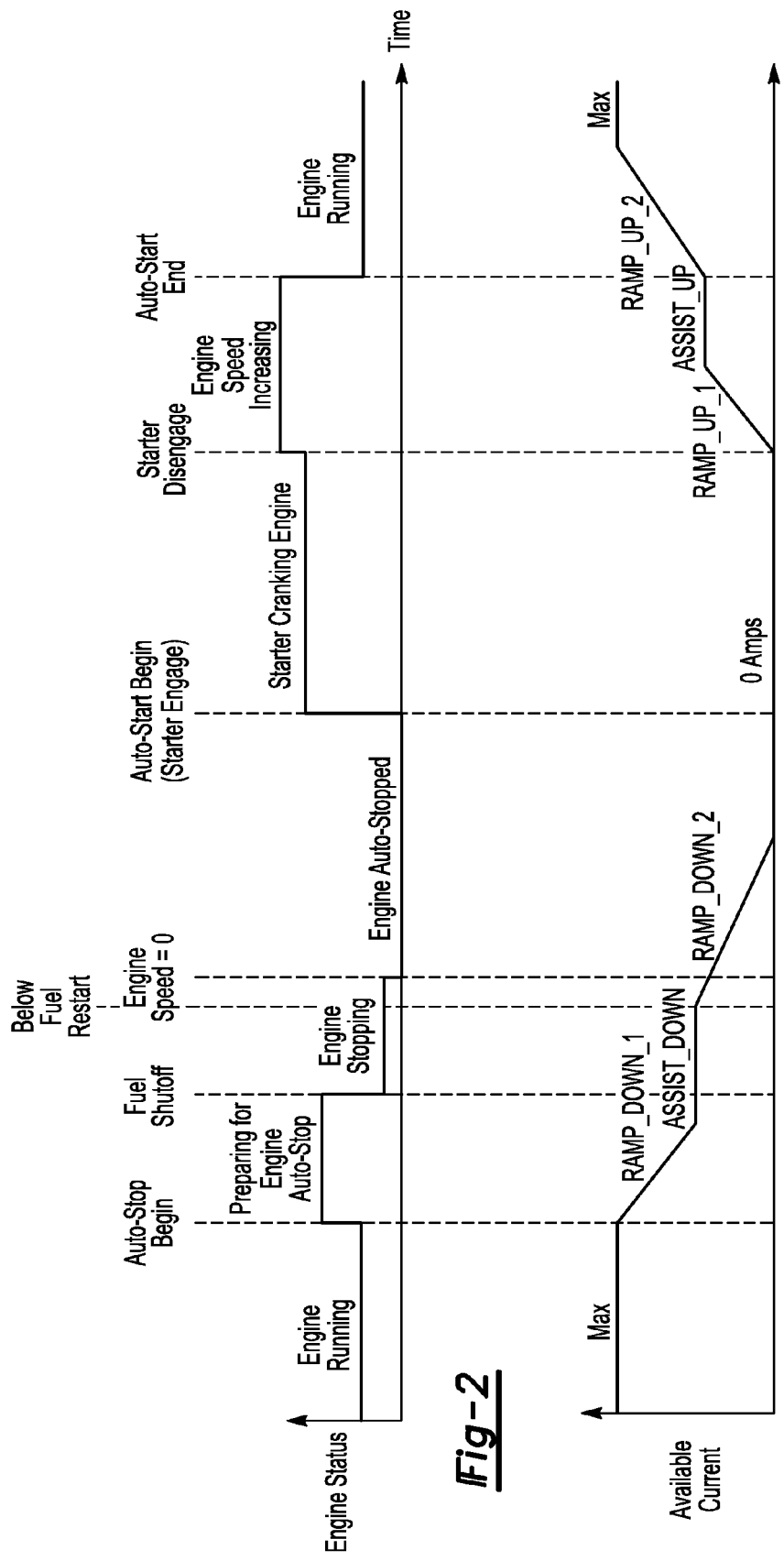
FIG. 2 is a plot illustrating engine status during an auto stop event.
FIG. 3 is a plot illustrating available electric power steering assist current during the auto stop event of FIG. 2.

Referring to FIG. 2, an engine auto stop event may include several stages: "auto-stop begin," which marks the beginning of the engine auto stop event; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; "auto-start end," which marks the point at which the speed of the engine achieves its running speed (a speed at or above target idle speed).

Referring to FIG. 3, the available electric power steering assist system current (e.g., current available for consumption by the electric power steering system 16) may be ramped down around the beginning of an engine auto stop event and ramped up around the end of the engine auto stop event. Such ramping may prevent a driver from experiencing sudden changes in steering efforts, may limit the duration during which the battery 13 is used to power the electric power steering assist system 16, and/or may limit the adverse effect of additional steering inputs on system voltage during and after the transition from the alternator 14 to the battery 13 as the source of electric power steering assist system current.

Upon detecting an auto stop event and before beginning to ramp down the available electric power steering assist system current, the controllers 24 may determine whether the current being consumed by the electric power steering assist system 16 is less than a specified threshold (e.g., 40 Amps). If no, the engine auto stop is inhibited. (This check may also be performed during the initial stages of the ramping process. That is, if the current being consumed by the electric power steering assist system 16 exceeds a specified threshold, which may depend on the stage of the auto stop event, the engine auto stop may be inhibited.) This may ensure that the battery 13 is able to handle the current draw during and after the transition from the alternator 14 to the battery 13 as the source of electric power steering assist system current. If yes, during the "preparing for engine auto-stop" stage, the controllers 24 may begin to ramp down the available electric power steering assist system current from a maximum to ASSIST_DOWN using the ramp rate RAMP_DOWN_1. The ASSIST_DOWN level may limit the adverse effect of additional driver steering input on system voltage during and after the transition from the alternator 14 to the battery 13 as the source of electric power steering assist system current. By ramping the assist to this level, the driver may not be impacted since all that is removed is unused assist. Also, the ramp rate may be adjusted such that the driver does not feel this removal of available assist even if they move the steering wheel 18.

Once the engine speed is less than a threshold value such that the starter 11 is required for engine restart (that is, after "below fuel restart"), available electric power steering assist system current may be ramped to 0 using the ramp rate RAMP_DOWN_2. This may ensure that in situations in which the engine 12 can be restarted without the use of the starter 11, a driver's steering effort or input torque needed to turn the steering wheel 18 is not impacted. Also, this ramp rate may be adjusted such that the driver does not feel a sudden steering wheel kick back and to ensure that the assist is completely ramped out before the earliest point when the starter 11 can be engaged.

Once the starter 11 is disengaged during engine restart (that is, after "starter disengage"), available electric power steering assist system current may be ramped up using the ramp rate RAMP_UP_1 to ASSIST_UP. This may provide the driver a certain level of available assist from battery power while the engine 12 is starting.

After the alternator 14 is fully operational (that is, after "auto-start end"), available electric power steering assist system current may be ramped to its maximum value using the ramp rate RAMP_UP_2. The system then resumes normal operation.

Referring to FIG. 4, a partial engine auto stop event may include fewer stages than a full engine auto stop event (compare FIG. 3) because the engine 12 is restarted prior to complete shutdown. In the example of FIG. 4, the controllers 24 detect an engine auto start condition (e.g., a driver disengaging the brake pedal 22) during the "engine stopping" stage (prior to "below fuel restart"). The controllers 24 thus command fuel flow to the engine 12 to resume, which causes the engine 12 to restart.

Referring to FIG. 5, available electric power steering assist system current may be ramped up using the ramp rate RAMP_UP_1 once the controllers detect an engine auto start condition in anticipation of further steering inputs from the driver. Available electric power steering assist system current may then be ramped up to its maximum using the ramp rate RAMP_UP_2 after the engine begins running (after the engine achieves a speed at or above target idle speed).

The ramp rates, assist levels (if any), and timing as to when the ramping(s) initiate and/or terminate can be calibrated to provide desired steering performance. As an example, certain ramping algorithms may lack the ASSIST_DOWN and/or ASSIST_UP levels. That is, the available electric power steering assist system current may be ramped from its maximum to 0 and/or vice versa without being held at any intermediary threshold value. Other scenarios are also possible.

The algorithms disclosed herein may be deliverable to/implemented by a processing device, such as the controllers 24, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
a controller configured to, during an engine auto stop event, continuously reduce at a first rate available electric power steering system current to a non-zero threshold value before fuel to an engine is shut off and continuously reduce at a second rate different than the first rate the available electric power steering system current from the non-zero threshold value to 0 after fuel to the engine is shut off.

2. A method for controlling an automotive electric power steering system comprising:
responsive to an auto stop event of an engine, continuously reducing by a controller an available electric power steering system current at a first rate before fuel to the engine is shut off and at a second rate different than the first rate after fuel to the engine is shut off.

3. The method of claim 2 wherein the available electric power steering system current is reduced to a non-zero threshold value before fuel to the engine is shut off.

4. The method of claim 3 wherein the available electric power steering system current is reduced from the non-zero threshold value to 0 after fuel to the engine is shut off.

5. The method of claim 2 further comprising increasing from 0 the available electric power steering system current after a starter is disengaged from cranking the engine.

6. The method of claim 5 wherein the available electric power steering system current is increased to a non-zero threshold value before the engine is running at or above target idle speed.

7. The method of claim 5 wherein the available electric power steering system current is increased from the non-zero threshold value to a maximum value after the engine is running at or above target idle speed.

8. The method of claim 5 wherein a rate at which the available electric power steering system current is increased from 0 to the non-zero threshold value is different than a rate at which the available electric power steering system current is increased from the non-zero threshold value to the maximum value.

9. The method of claim 2 further comprising, responsive to an auto start condition, increasing the available electric power steering system current.

10. An automotive vehicle comprising:
an engine;
an electric power steering system; and
a controller configured to, during an auto stop event of the engine, continuously reduce an available electric power steering system current at a first rate before fuel to the engine is shut off and responsive to fuel shut off, continuously reduce the available electric power steering system current at a second rate different than the first rate.

11. The automotive vehicle of claim 10 wherein the controller is further configured to reduce the available electric power steering system current to a non-zero threshold value before fuel to the engine is shut off.

12. The automotive vehicle of claim 11 wherein the controller is further configured to reduce the available electric power steering system current from the non-zero threshold value to 0 after fuel to the engine is shut off.

13. The automotive vehicle of claim 11 wherein the controller is further configured to increase from 0 the available electric power steering system current after a starter is disengaged from cranking the engine.

14. The automotive vehicle of claim 13 wherein the controller is further configured to increase the available electric power steering system current to a non-zero threshold value before the engine is running at or above target idle speed.

15. The automotive vehicle of claim 14 wherein the controller is further configured to increase the available electric power steering system current from the non-zero threshold value to a maximum value after the engine is running at or above target idle speed.

16. The automotive vehicle of claim 15 wherein the controller is further configured to increase the available electric power steering system current from 0 to the non-zero threshold value at a rate that is different than a rate at which the controller increases the available electric power steering system current from the non-zero threshold value to the maximum value.

17. The automotive vehicle of claim 11 wherein the controller is further configured to, responsive to an auto start condition, increase the available electric power steering system current.

18. The automotive vehicle of claim 10 wherein the controller is further configured to increase the available electric power steering system current before the engine is running at or above target idle speed at a rate that is different than a rate at which the controller increases the available electric power steering system current after the engine is running at or above target idle speed.

\* \* \* \* \*